United States Patent [19]
Thompson

[11] Patent Number: 5,791,144
[45] Date of Patent: Aug. 11, 1998

[54] TURBOCHARGER PRESSURE COMPENSATION SYSTEM

[75] Inventor: Jerome W. Thompson, Cypress, Calif.

[73] Assignee: AlliedSignal Inc., Morristown, N.J.

[21] Appl. No.: 854,077

[22] Filed: May 9, 1997

[51] Int. Cl.⁶ .................... F02B 29/04; F16L 35/00
[52] U.S. Cl. .................... 60/599; 60/322; 123/563; 285/228
[58] Field of Search .................... 60/322, 599; 123/563; 285/227, 228

[56] References Cited

U.S. PATENT DOCUMENTS

| | | | |
|---|---|---|---|
| 2,479,104 | 8/1949 | Dreyer | 285/228 |
| 2,568,923 | 9/1951 | McNeary et al. | 285/228 |
| 4,495,773 | 1/1985 | Inoue et al. | 60/605.1 |
| 4,848,086 | 7/1989 | Inoue et al. | 123/564 X |
| 5,072,698 | 12/1991 | Fujihira et al. | 123/563 |
| 5,248,170 | 9/1993 | Francis | 285/227 X |
| 5,299,840 | 4/1994 | Heye | 285/227 X |

OTHER PUBLICATIONS

C.M. Daniels; Bellows Design for Aerospace Vehicles; Apr. 17, 1962; Sections 3.4 through 3.4.3.

Report of Pre–Flight Certification Test on Inboard Fuel, Pressure–Volume Compensating Duct Assembly To NASA–MSFC Specification Control Drawing 20M02003, Rev.D (Contract No. NAS8–5097) NASA–MSFC Part No. 20M02003 Arrowhead Part No. 11714 For National Aeronautics and Space Administration; George C. Marshall Space Flight Center; Huntsville, Alabama; Jun. 18, 1965.

*Primary Examiner*—Tony M. Argenbright
*Attorney, Agent, or Firm*—Felix L. Fischer

[57] ABSTRACT

A boosted charge air system which eliminates adverse effects of pressure loading on the system components incorporates a pressure compensator mounted intermediate a turbocharger compressor section outlet duct and the inlet duct of a charge air cooler. The compensator includes first and second end bellows each with a first cross sectional area, a middle bellows intermediate the first and second end bellows with an annular cross sectional area substantially equal to the first cross sectional area, first and second end flanges connecting the first and second end bellows to the outlet duct and inlet duct, respectively, and first and second annular plates connecting the middle bellows to the first and second end bellows. An internal restraining structure for the compensator includes two sets of struts interconnecting the first end flange to the second annular plate and the second end flange to the first annular plate. For applications where exhaust pressure variations induce undesirable loading on the charge air system components a compensator, as described, is incorporated intermediate the exhaust manifold outlet duct and the turbine section inlet duct for the turbocharger.

9 Claims, 3 Drawing Sheets

TURBOCHARGER PRESSURE COMPENSATION SYSTEM

BACKGROUND OF THE INVENTION

1. Field of the Invention

The present invention relates generally to the field of boosted pressure charge air delivery ducting for use on an internal combustion engine equipped with a turbocharger. More particularly, the invention provides a boosted charge air system employing a multi-diameter, internally supported bellows for back pressure compensation in turbocharger connection ducting while allowing relative motion between the charge air system components in a dynamic engine compartment environment.

2. Description of the Related Art

Boosted charge air systems for reciprocating engine applications in automobiles, trucks and aircraft produce high pressure air ducted to the engine inlet for added performance. Ducting connecting the turbocharger to the charge air cooler requires flexibility to allow for relative motion between the engine, on which the turbocharger is typically hard mounted, and the charge air cooler since both are soft mounted to the frame of the vehicle. Flexing of the frame, thermal expansion and other motion between the components in the dynamic under-hood environment must be accommodated by the charge air ducting. Present charge air systems achieve the required flexibility with O-ring slip joints or convoluted hose sections. These types of duct connections cause an undesirable pneumatic load which must be reacted by the components of the charge air system. The reaction loads in the duct connections on the turbocharger compressor housing and charge air cooler require overly robust designs of these components or can result in failures.

Similar pressure load problems exist in ducting between the engine exhaust manifold and the turbine inlet for the turbocharger, particularly in applications employing exhaust back pressure for engine braking and exhaust gas recirculation.

It is, therefore, desirable to provide a turbocharger boosted air system including ducting components for the charge air system which accommodate the necessary relative motion of the charge air system elements, yet avoid the pneumatic load problems of present designs.

It is similarly desirable to provide a turbocharger system which accommodates pressure loading in the exhaust component train.

SUMMARY OF THE INVENTION

A boosted charge air system incorporating the present invention includes a turbocharger having a turbine section with an inlet to receive exhaust gas from a reciprocating engine and a turbine to convert energy from the exhaust gas. The turbine drives a compressor in a compressor section which includes an inlet to receive charge air and an outlet duct delivering charge air pressure boosted by the compressor. A pressure compensator is connected intermediate the compressor section outlet duct and a charge air cooler inlet duct. The compensator has first and second end bellows each with a first cross sectional area, a middle bellows intermediate the first and second end bellows with an annular cross sectional area substantially equal to the first cross sectional area, first and second end flanges connecting the first and second end bellows to the outlet duct and inlet duct, respectively, and first and second annular plates connecting the middle bellows to the first and second end bellows.

Similarly, in certain embodiments, the turbine section includes an inlet duct to receive exhaust gas from the reciprocating engine which has an exhaust manifold with an outlet duct and a pressure compensator is connected intermediate the engine outlet duct and the turbine section inlet duct. The compensator, is of common design to that described previously.

BRIEF DESCRIPTION OF THE DRAWINGS

The details and features of the present invention will be more clearly understood with respect to the detailed description and drawings in which.

DETAILED DESCRIPTION OF THE INVENTION

Figure 1:
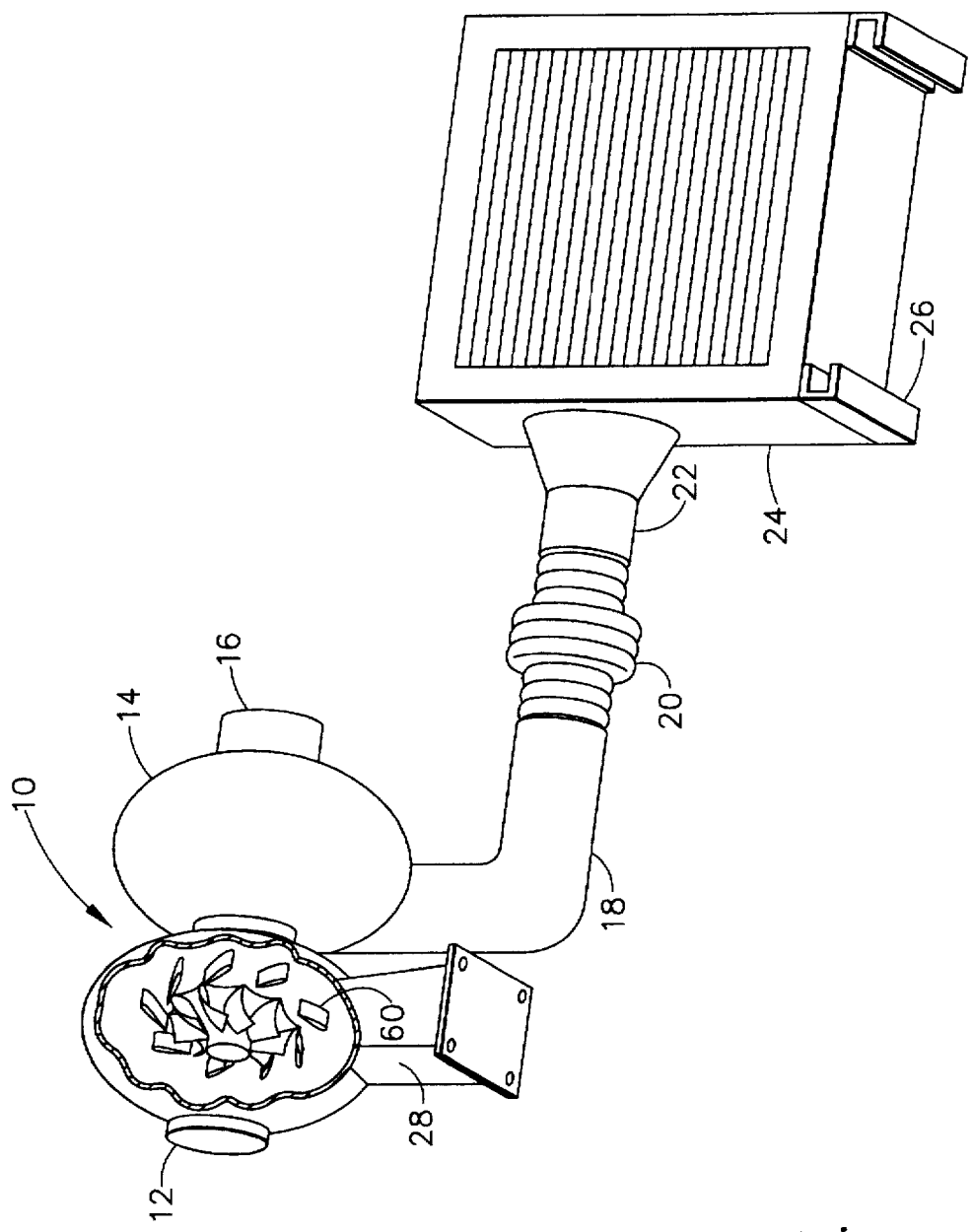
FIG. 1 is a diagram of the elements of a charge air system employing the present invention.

Referring to the drawings, FIG. 1 shows a boosted charge air system employing a turbocharger 10 having a turbine section 12 receiving exhaust gas from the vehicle engine and converting the exhaust energy to drive a compressor section 14. The compressor draws atmospheric or ram air through inlet 16 and the compressed charge air is provided through outlet duct 18. A boost pressure compensator 20 interconnects the turbocharger outlet duct to an air duct 22 extending to a charge air cooler 24.

The charge air cooler is soft mounted to the vehicle frame (not shown) using flexible mounts 26. The turbocharger is mounted to the engine through a flange 28 on the turbine housing or center housing depending on turbocharger configuration. Soft mounting of the engine and charge air cooler to the frame of the vehicle results in relative motion between the turbocharger and charge air cooler. Additionally, compression heating of the charge air exiting the compressor may result in temperatures 400 degrees F. or more over ambient resulting in significant thermal expansion of the charge air ducting. The turbocharger compressor provides boost pressure ratios of about 2.0 and higher which imparts the pneumatic load which is reacted by the boost pressure compensator to avoid loading of the turbocharger outlet duct, charge air duct and charge air cooler.

Figure 2:
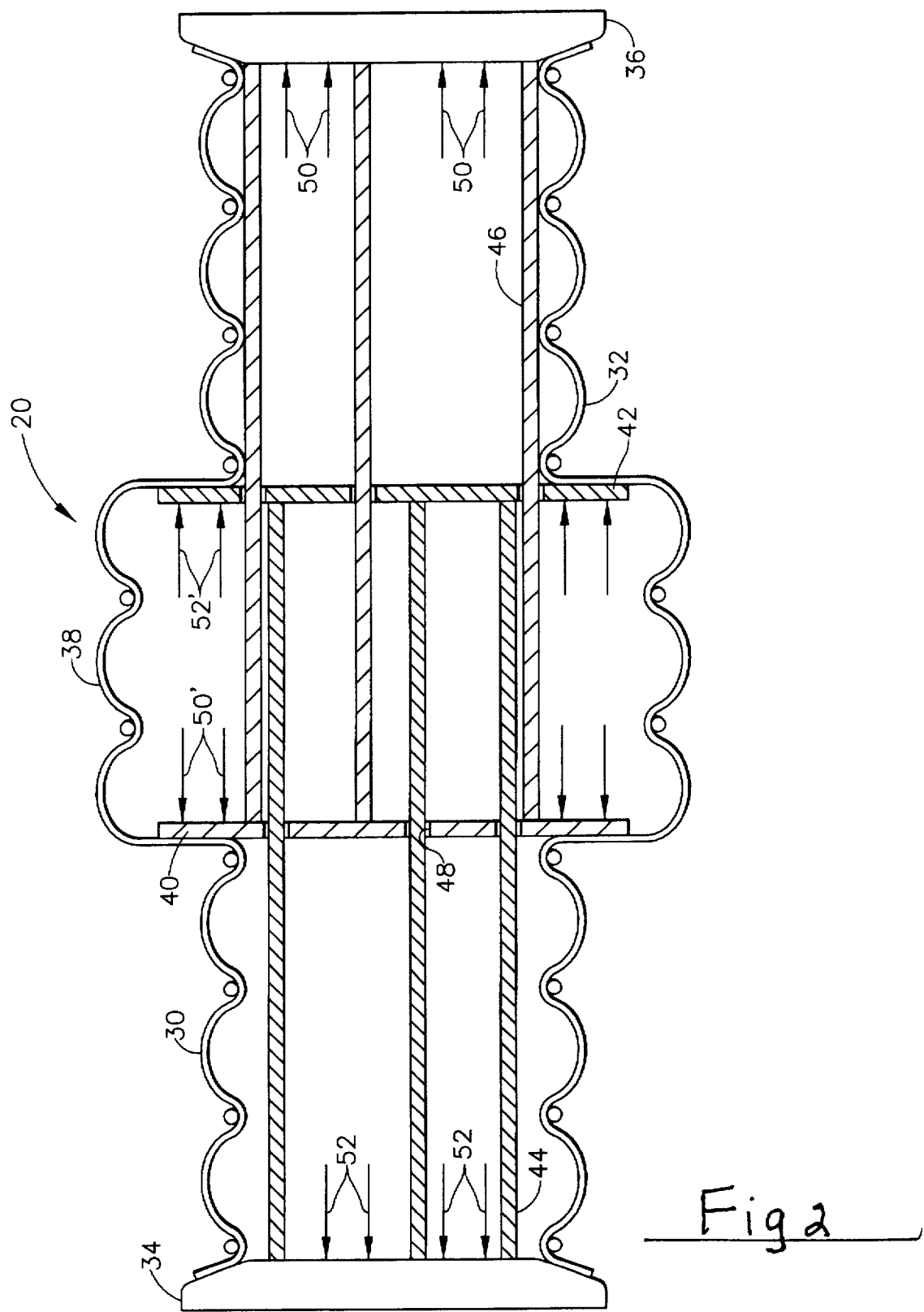
FIG. 2 is a section view of the boost pressure compensator.

The pressure compensator is shown in detail in FIG. 2. The compensator includes two end bellows 30 and 32 having comparable mean diameter to the charge air ducting. Flanges 34 and 36 are attached to the two end bellows for connection of the turbocharger outlet duct 18 and charge air duct 22, respectively. A middle bellows 38 extends intermediate the two end bellows. The two end bellows and the middle bellows are connected to annular plates 40 and 42. A first set of restraining struts 44 extends between the first flange 34 and second annular plate 42. A second set of restraining struts 46 extends between the second flange 36 and the first annular plate 40. At least two struts are present in each set, with three or more struts employed in embodiments requiring greater lateral stability of the compensator. Apertures 48 or slots in the annular plates accommodate struts extending from the opposite plate to the respective end flange to provide mutual clearance for operation. The first and second sets of struts are clocked for clearance of the sets of struts. Alternative embodiments employ tabs extending radially inwardly from the annular plates for connection of the struts. Incorporation of the annular plates and restraining struts simplifies the structural design requirements for the bellows allowing any lateral and bending loads to be carried by reaction between the struts and plates. The bellows are structurally attached and sealed to the flanges and plates by brazing, welding or bonding as required by material choices employed in varying embodiments.

The annular area of the middle bellows and plates equals the area of the end bellows providing equal reaction areas for the pressure loads in the charge air ducting. Pneumatic loading represented by arrows 50 is reacted by equal and opposite loading on the first annular plate represented by arrows 50'. Similarly, the opposing pneumatic loading represented by arrows 52 is reacted by equal and opposite loading on the second annular plate represented by arrows 52'. The pressure compensation of the bellows arrangement allows the compensator to be extended or compressed by mechanical or thermal loads in the charge air system while pressure fluctuations and the associated loads are reacted solely by the compensator. Only frictional loads caused by the restraint system in the compensator need to be accommodated by the design of the charge air ducting, turbocharger attachments and charge air cooler attachments. These loads are minimal in comparison with the pneumatic loads carried by current charge air system designs.

Figure 3:
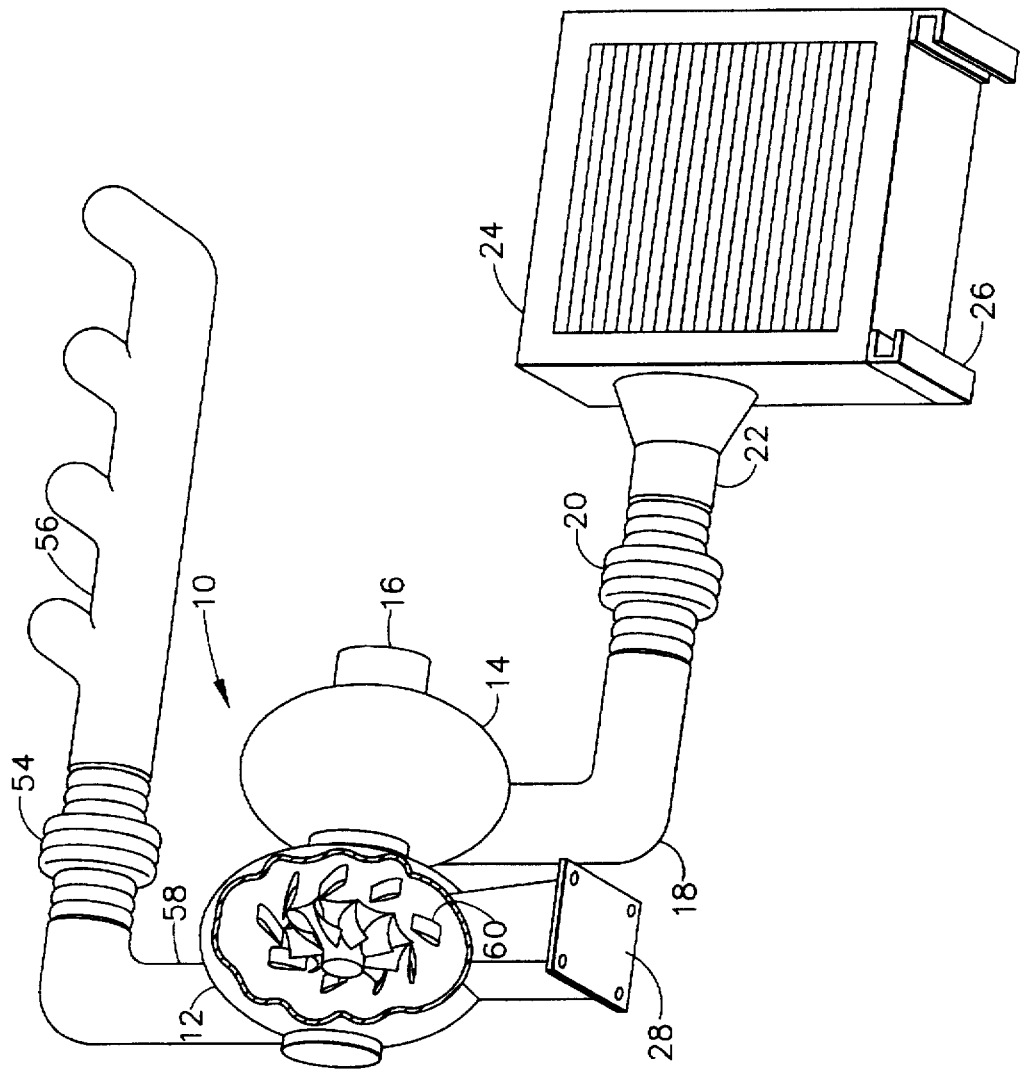
FIG. 3 is a schematic view of a system according to the present invention including a compensator incorporated into the exhaust ducting into the turbocharger turbine inlet.

Boosted charge air system designs employing turbochargers in present commercial diesel applications must also accommodate significant back pressure variation in the exhaust circuit imposed by engine brakes and exhaust gas recirculation requirements. Valving or variable nozzle embodiments in the turbine section of the turbocharger provide back pressure for engine braking. FIG. 3 shows the implementation of a pressure compensator 54 having a structure as defined above in the ducting intermediate the exhaust manifold 56 and the turbine inlet 58 for the turbocharger. For the embodiment shown, back pressure variation is accomplished by a variable nozzle 60 in the turbine section such as that disclosed in U.S. Pat. No. 4,804,316 entitled Suspension for the Pivoting Vane Actuation Mechanism of a Variable Nozzle Turbocharger having a common assignee with the present application, the disclosure of which is incorporated by reference. Exhaust pressure variation is reacted by the compensator as previously described while thermal expansion or relative motion between the turbocharger and exhaust manifold are also accommodated.

Having now described the invention in detail as required by the patent statutes, those skilled in the art will recognize modifications and substitutions to the specific embodiments disclosed herein. Such modifications and substitutions are within the scope and intent of the present invention as defined in the following claims.

What is claimed is:

1. A boosted charge air system comprising:

a turbocharger having a turbine section including an inlet to receive exhaust gas from a reciprocating engine and a turbine to convert energy from the exhaust gas, the turbine driving a compressor in a compressor section, the compressor section including an inlet to receive charge air and an outlet duct delivering charge air pressure boosted by the compressor;

a charge air cooler having an inlet duct; and a pressure compensator connected intermediate the compressor section outlet duct and the charge air cooler inlet duct, the compensator having first and second end bellows each with a first cross sectional area, a middle bellows intermediate the first and second end bellows with an annular cross sectional area substantially equal to the first cross sectional area, first and second end flanges connecting the first and second end bellows to the outlet duct and inlet duct, respectively, and first and second annular plates connecting the middle bellows to the first and second end bellows.

2. A boosted charge air system as defined in claim 1 wherein the pressure compensator further comprises:

a first set of at least two restraining struts connected between the first flange and the second annular plate; and a second set of at least two restraining struts connected between the second flange and the first annular plate.

3. A boosted charge air system as defined in claim 2 further comprising means for providing mutual clearance between the first and second sets of struts and the first and second annular plates, respectively.

4. A boosted charge air system as defined in claim 2 wherein the first set of struts extends through apertures in the first annular plate and the second set of struts extends through apertures in the second annular plate.

5. A boosted charge air system comprising:

a turbocharger having a turbine section including an inlet duct to receive exhaust gas from a reciprocating engine and a turbine to convert energy from the exhaust gas, the turbine driving a compressor in a compressor section;

an exhaust manifold on the engine having an outlet duct; and a pressure compensator connected intermediate the engine outlet duct and the turbine section inlet duct, the compensator having first and second end bellows each with a first cross sectional area, a middle bellows intermediate the first and second end bellows with an annular cross sectional area substantially equal to the first cross sectional area, first and second end flanges connecting the first and second end bellows to the outlet duct and inlet duct, respectively, and first and second annular plates connecting the middle bellows to the first and second end bellows.

6. A boosted charge air system as defined in claim 5 wherein the pressure compensator further comprises:

a first set of at least two restraining struts connected between the first flange and the second annular plate; and a second set of at least two restraining struts connected between the second flange and the first annular plate.

7. A boosted charge air system as defined in claim 6 further comprising means for providing mutual clearance between the first and second sets of struts and the first and second annular plates, respectively.

8. A boosted charge air system as defined in claim 6 wherein the first set of struts extends through apertures in the first annular plate and the second set of struts extends through apertures in the second annular plate.

9. A boosted charge air system as defined in claim 5 wherein the turbine section further includes a variable nozzle.

* * * * *